US011691499B2

(12) United States Patent
Yenerdag et al.

(10) Patent No.: US 11,691,499 B2
(45) Date of Patent: Jul. 4, 2023

(54) SHUTTER DEVICE FOR VEHICLE

(71) Applicant: DENSO CORPORATION, Kariya (JP)

(72) Inventors: Basmil Yenerdag, Kariya (JP); Yukio Shidara, Kariya (JP)

(73) Assignee: DENSO CORPORATION, Kariya (JP)

(*) Notice: Subject to any disclaimer, the term of this patent is extended or adjusted under 35 U.S.C. 154(b) by 226 days.

(21) Appl. No.: 17/152,983

(22) Filed: Jan. 20, 2021

(65) Prior Publication Data

US 2021/0138891 A1 May 13, 2021

Related U.S. Application Data

(63) Continuation of application No. PCT/JP2019/025861, filed on Jun. 28, 2019.

(30) Foreign Application Priority Data

Jul. 26, 2018 (JP) ................................ 2018-140321

(51) Int. Cl.
*B60K 11/00* (2006.01)
*B60K 11/04* (2006.01)
*B60K 11/08* (2006.01)

(52) U.S. Cl.
CPC ............ *B60K 11/04* (2013.01); *B60K 11/085* (2013.01)

(58) Field of Classification Search
CPC .............................. B60K 11/085; B60K 11/04
See application file for complete search history.

(56) References Cited

U.S. PATENT DOCUMENTS

2013/0223980 A1* 8/2013 Pastrick ............... B60K 11/085 415/1
2014/0216834 A1* 8/2014 Elliott .................. B60K 11/085 180/68.1
2014/0284123 A1* 9/2014 Bourqui ............... B60K 11/085 180/68.1
2014/0295749 A1* 10/2014 Hijikata ............... B60K 11/085 454/256

(Continued)

FOREIGN PATENT DOCUMENTS

JP 2016055719 A 4/2016
JP 2016080250 A 5/2016

OTHER PUBLICATIONS

U.S. Appl. No. 17/153,093, filed Jan. 20, 2021, Takuya Mitsuhashi et al.

*Primary Examiner* — Hau V Phan
(74) *Attorney, Agent, or Firm* — Harness, Dickey & Pierce, P.L.C.

(57) ABSTRACT

The shutter device has a blade and a frame member which supports the blade in a rotatable manner. The device has a shaft arranged along the frame member, an actuator device for rotating the shaft, and a link member which opens and closes the blade by transmitting a rotational force of the shaft to the blade. The device has a calibration structure having a calibration member formed on the shaft and a calibration surface formed on the frame member. The calibration structure calibrates a rotational position of the shaft by coming into contact with the calibration member onto the calibration surface. The device further has a discharge structure which discharges foreign matters existing between the calibration member of the shaft and the calibration surface of the frame member.

9 Claims, 13 Drawing Sheets

Z1 Z2 24 80 80 25 21 20 30 40 10 51 80 23 80 50 60 80 26 80 Z Y X 90 22 80

(56) References Cited

U.S. PATENT DOCUMENTS

| | | | | |
|---|---|---|---|---|
| 2014/0345400 | A1* | 11/2014 | Bourqui | B60K 11/085<br>74/89.16 |
| 2015/0197147 | A1* | 7/2015 | Koh | B60K 11/085<br>310/198 |
| 2016/0376834 | A1* | 12/2016 | Meyerink | E06B 7/096<br>49/82.1 |
| 2017/0080794 | A1* | 3/2017 | Yamamoto | B60K 11/085 |
| 2017/0248066 | A1* | 8/2017 | Wolf | B60K 11/085 |
| 2017/0297424 | A1* | 10/2017 | Ibañez Moreira | B60K 11/085 |
| 2018/0009313 | A1* | 1/2018 | Watanabe | B60K 11/085 |
| 2018/0154764 | A1* | 6/2018 | Uchida | B60K 11/085 |

* cited by examiner 40
10
51
80
23
80
50
80
26
80
80
60
30
20
21
25
22
90
24
80
80
Z1
Z2
X
Y
Z

SHUTTER DEVICE FOR VEHICLE

CROSS REFERENCE TO RELATED APPLICATIONS

The present application is a continuation application of International Patent Application No. PCT/JP2019/025861 filed on Jun. 28, 2019, which designated the U.S. and claims the benefit of priority from Japanese Patent Application No. 2018-140321 filed in Japan filed on Jul. 26, 2018, the entire disclosure of the above application is incorporated herein by reference.

TECHNICAL FIELD

A present disclosure relates to a shutter device for a vehicle.

BACKGROUND

A vehicle uses air to dissipate heat from a heat exchanger. Devices are developed to control an amount of air. In one aspect, the air also brings foreign matters such as mud particles and the like. The devices to control the air is required to work properly even in such an environment. In the above aspects, or in other aspects not mentioned, there is a need for further improvements in a shutter device for a vehicle.

SUMMARY

This disclosure provides a shutter device for a vehicle. The shutter device comprising: a blade; a frame member which supports the blade in a rotatable manner; a shaft arranged along the frame member; an actuator device for rotating the shaft; a link member which opens and closes the blade by transmitting a rotational force of the shaft to the blade; and a contact structure having a member formed on the shaft and a surface formed on the frame member which are come into contact with each other at a rotational end of the shaft. The frame member is formed with a discharge structure which discharges a foreign matter existing between the member of the shaft and the surface of the frame member. Alternately, the rotatable member of the shaft is formed with a discharge structure which discharges a foreign matter existing between the member of the shaft and the surface of the frame member.

According to this configuration, even if a foreign matter is clogged between the member of the shaft and the surface of the frame member, the foreign matter is discharged through the discharge structure. As a result, it is hard to occur a situation in which a rotational position of the shaft is erroneously learned based on a position where the member of the shaft comes into contact with the foreign matter. Therefore, it is possible to more surely perform the calibration of the rotational position of the shaft.

BRIEF DESCRIPTION OF DRAWINGS

The disclosure is further described with reference to the accompanying drawings in which.

DETAILED DESCRIPTION

Figure 1:
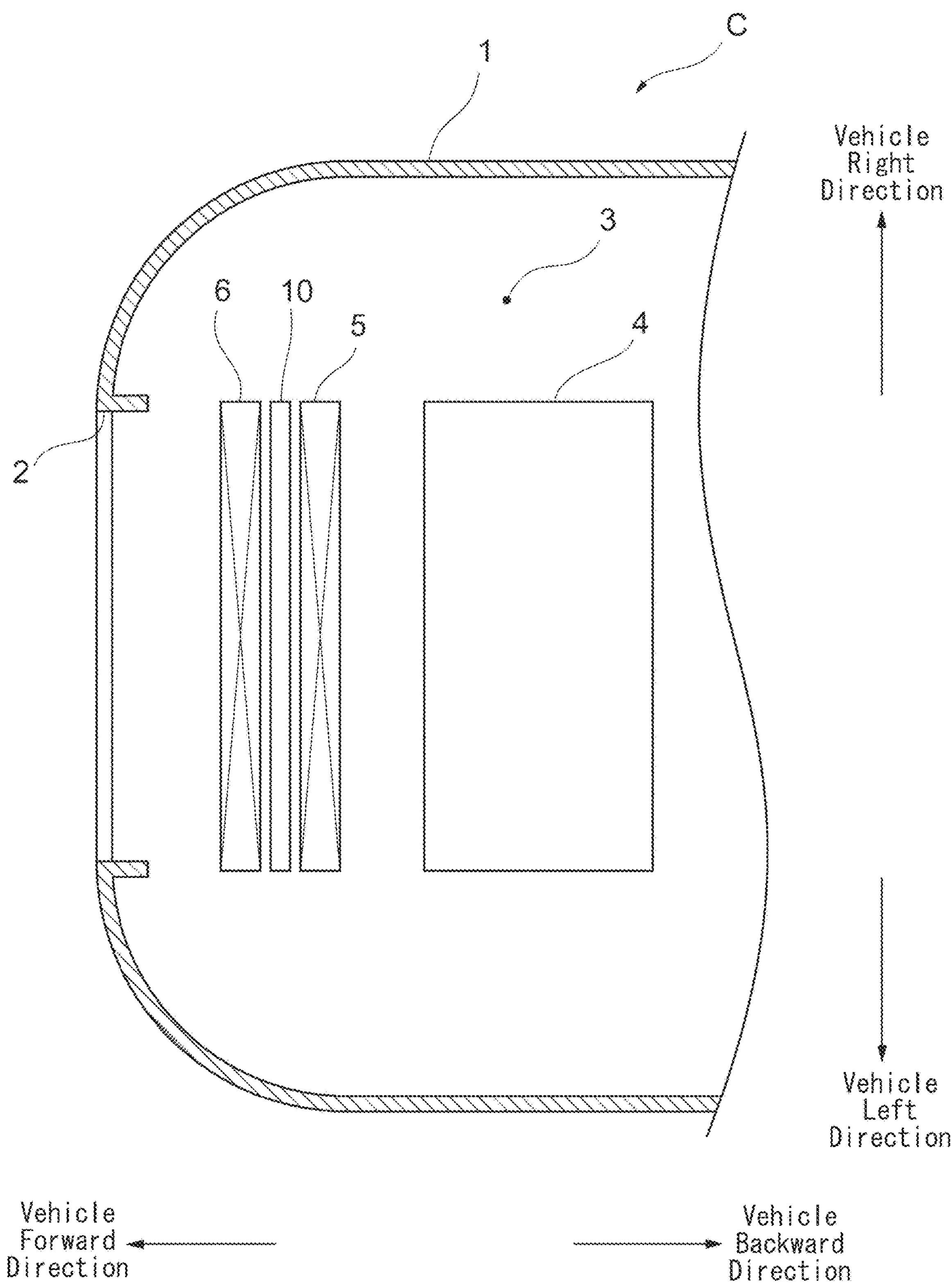
FIG. 1 is a diagram schematically showing a front part of a vehicle.

Hereinafter, embodiments of a vehicle shutter device are described with reference to the drawings. To facilitate understanding, identical constituent elements are designated with identical symbols in the drawings where possible with the duplicate description omitted.

A vehicle introduces air from a front opening to an engine room. The introduced air is used to dissipate heat from a radiator through which an engine cooling water flows or heat from a condenser of an air conditioner for a vehicle. A shutter device capable of temporarily blocking the air flow from the front opening to the engine room may be installed in such a vehicle.

JP2016-55719A discloses a shutter device which has a plurality of blades having a pair of shaft portions on both ends and a frame member supporting the shafts of the blades in a rotatable coupled manner. Each blade opens and closes by rotating around the shaft portions. In this shutter device, the air can pass through when the plurality of blades are in an open state, and the air can be blocked through the frame member when the plurality of blades are in a closed state. Notch shapes are formed on the shaft portion of the blade so as to extend along the axial direction thereof. As a result, the notch shape defines a gap between the notch shape of the blade and the frame member. Therefore, even if a foreign matter enters between the shaft portion and the frame member, the foreign matter may be removed by an air flow passing through the gap between the shaft portion of the blade and the frame member. Therefore, it is possible to prevent the blade from becoming sluggish.

A shutter device for a vehicle may be configured to have a frame member, a shaft arranged along the frame member, an actuator device for rotating the shaft, and a link member for opening and closing the plurality of blades by transmitting a rotational force of the shaft to the plurality of blades. It is possible to operate in opening and closing the plurality of blades at once by the actuator device by using the shutter device having the above-mentioned configuration.

On the other hand, in the shutter device having the above-mentioned configuration, if a rotational position of the shaft is shifted, an open position and a close position of the blade may be shifted. Therefore, it is preferable that the shutter device performs a so-called calibration operation which calibrates the rotational position of the shaft. It is possible to perform the calibration of the rotational position of the shaft by leaning an initial position of the blade from a rotational position of the shaft at a contact position where a calibration member formed on an outer surface of the shaft is operated to come into physical contact with a predetermined portion of the frame member.

On the other hand, a foreign matter may enters a gap between the calibration member of the shaft and the predetermined portion of the frame member. When the calibration of the rotational position of the shaft is performed, the initial position of the shaft may be erroneously learned from a position where the calibration member of the shaft comes into contact with the foreign matter. In order to prevent the erroneous learning of the initial position of the shaft described above, it is needed to remove the foreign matter entering into the gap between the calibration member of the shaft and the predetermined portion of the frame member. A method using the air flow similar to the shutter device disclosed in JP2016-55719A may be one method to remove the foreign matter. However, if the foreign matter is clogged between the calibration member of the shaft and the predetermined portion of the frame member, the air flow alone is not enough to remove the foreign matter. As a result, the calibration of the rotational position of the shaft may not properly performed. It is an object of the present disclosure to provide a shutter device capable of more surely performing a calibration of the rotational position of the shaft.

First Embodiment

First, a schematic configuration of a vehicle equipped with the shutter device of the first embodiment is described.

As shown in FIG. 1, a front opening 2 is provided on a front of a body 1 of a vehicle C. Air in front of the body 1 is introduced into an engine room 3 of the vehicle C through the front opening 2. In the engine room 3, a radiator 5 and a condenser 6 are arranged in addition to an engine 4 of the vehicle C. The radiator 5 dissipates heat from a cooling water for cooling the engine 4 by performing heat exchange between the cooling water and the air introduced from the front opening 2. The condenser 6 is a component of a refrigeration cycle for an air conditioner mounted on the vehicle C and dissipates heat from a refrigerant by performing heat exchange between the refrigerant circulating in the refrigeration cycle and the air introduced from the front opening 2. The radiator 5 and the condenser 6 are arranged between the front opening 2 and the engine 4.

A shutter device 10 capable of temporarily blocking the air flow from the front opening 2 to the engine room 3 is arranged between the radiator 5 and the condenser 6. The shutter device 10 enables early warming up of the engine 4, for example, by temporarily blocking the air flow from the front opening 2 to the engine room 3 during a cold start of the engine 4. Further, the shutter device 10 improves an aerodynamic performance of the vehicle C by temporarily blocking the air flow from the front opening 2 to the engine room 3 when the vehicle C travels at high speed.

Next, the specific structure of the shutter device 10 is described.

Figure 2:
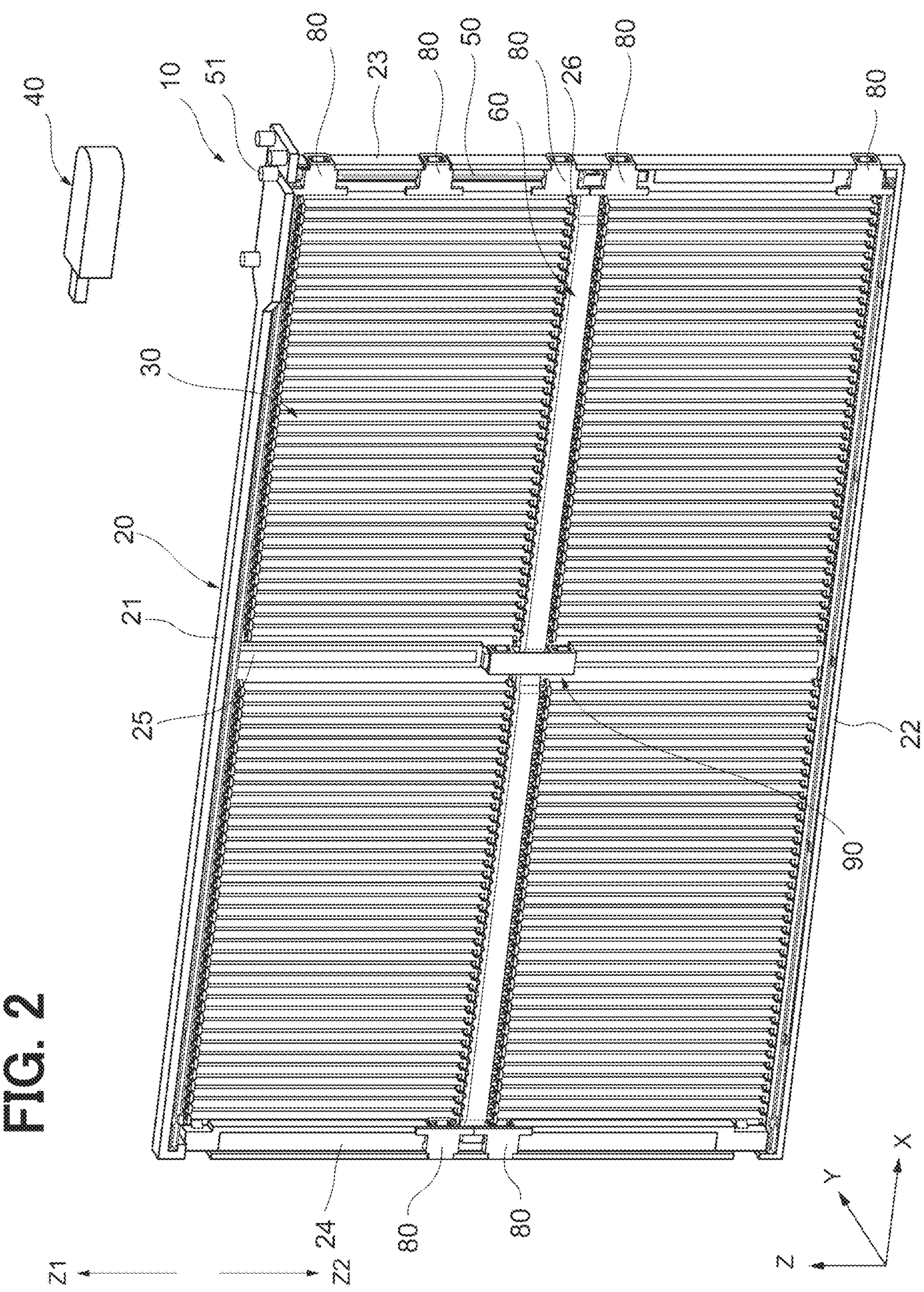
FIG. 2 is a perspective view showing a shutter device of a first embodiment.

As shown in FIG. 2, the shutter device 10 includes a frame member 20, a plurality of blades 30, and an actuator device 40.

The frame member 20 is formed in a square casing shape and has an upper frame piece 21, a lower frame piece 22, a right frame piece 23, and a left frame piece 24. The frame member 20 is made of, for example, a resin material. The air introduced from the front opening 2 shown in FIG. 1 flows through within the casing of the frame member 20. As shown in FIG. 2, the frame member 20 has a vertical reinforcing frame piece 25 and a lateral reinforcing frame piece 26 which are arranged in a cross shape to reinforce the frame pieces 21 to 24 within the casing. The vertical reinforcing frame piece 25 is provided so as to connect between central portions of the upper frame piece 21 and the lower frame piece 22. The lateral reinforcing frame piece 26 is provided so as to connect between central portions of the right frame piece 23 and the left frame piece 24. The reinforcing frame pieces 25 and 26 define four regions within the casing of the frame member 20.

Hereinafter, the longitudinal directions of the upper frame piece 21 and the lower frame piece 22 are also referred to as an X axis direction, and the longitudinal directions of the right frame piece 23 and the left frame piece 24 are also referred to as a Z axis direction. In this embodiment, the Z axis direction corresponds to the vertical direction. In the drawings, one of the Z axis directions is shown in a Z1 direction, and a direction opposite to the Z1 direction is shown in a Z2 direction. The Z1 direction is upward in the vertical direction, and the Z2 direction is downward in the vertical direction. Further, a direction orthogonal to both the X axis direction and the Z axis direction is also referred to as a Y axis direction. The Y axis direction corresponds to a direction of the air flow.

The plurality of blades 30 are arranged in the four regions defined within the casing of the frame member 20. In the four regions of the frame member 20, the plurality of blades 30 are arranged so as to have a longitudinal direction in the Z axis direction and are arranged side by side in the X axis direction. The plurality of blades 30 includes the blades 30 arranged between the upper frame piece 21 and the lateral reinforcing frame piece 26 have shaft portions which are provided at upper ends thereof and are supported by the upper frame piece 21 in a rotatable manner, and shaft portions which are provided at lower ends thereof and are supported by the lateral reinforcing frame piece 26 in a rotatable manner. The plurality of blades 30 includes the blades 30 arranged between the lower frame piece 22 and the lateral reinforcing frame piece 26 have shaft portions which are provided at upper ends thereof and are supported by the lateral reinforcing frame piece 26 in a rotatable manner, and shaft portions which are provided at lower ends thereof and are supported by the lower frame piece 22 in a rotatable manner.

Figure 3:
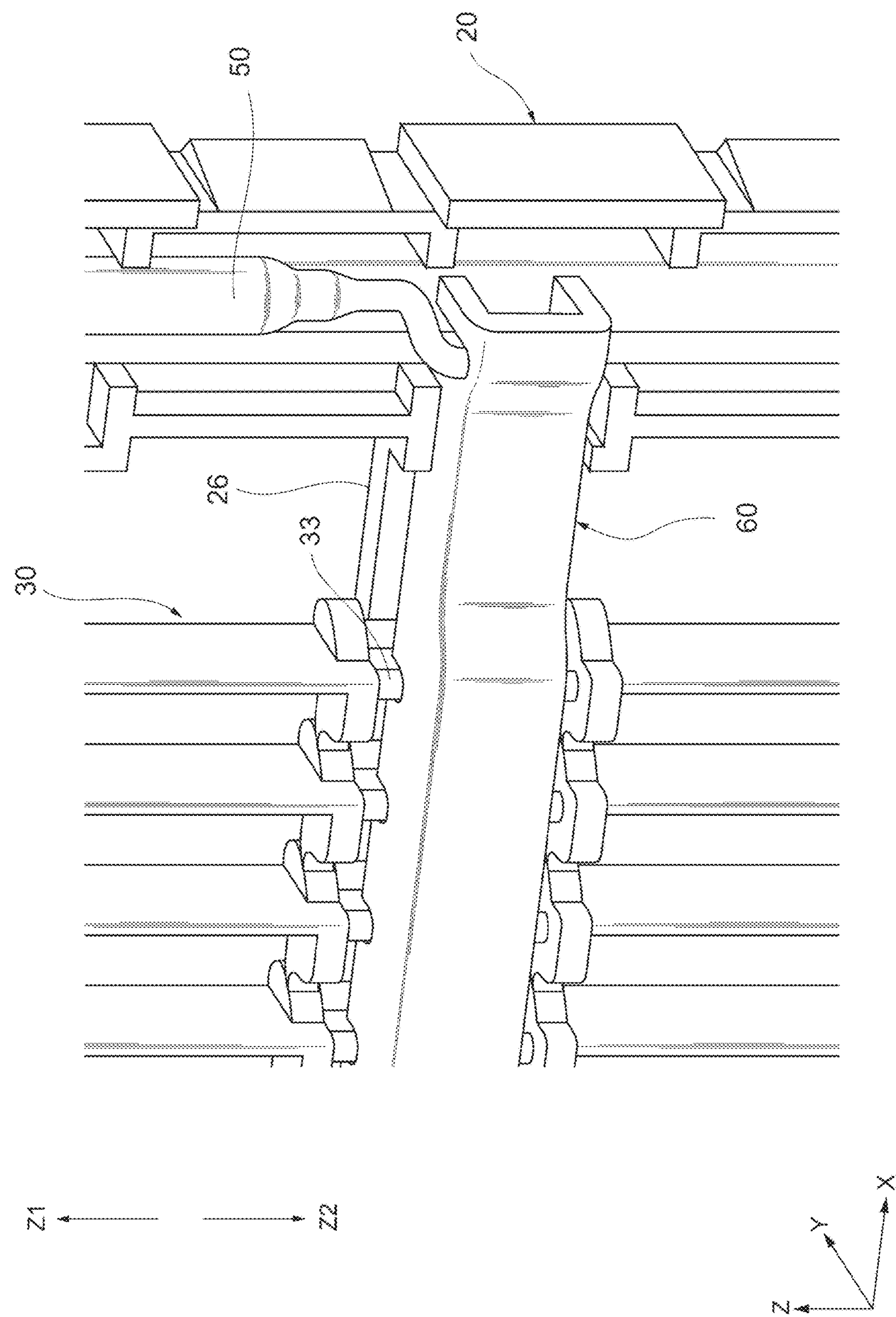
FIG. 3 is an enlarged view showing a connection structure between a link member and a shaft of the first embodiment.

A link member 60 is further assembled to the lateral reinforcing frame piece 26. The link member 60 is formed so as to extend in the X axis direction. As shown in FIG. 3, the link member 60 is coupled with a coupling structure 33 of each blade 30. A lower end of the shaft 50 is coupled with an one end of the link member 60.

As shown in FIG. 2, the shaft 50 is arranged along the right frame piece 23 upward from a central portion of the right frame piece 23. An upper end of the shaft 50 projects from an upper surface of one end of the upper frame piece 21. A gear 51 is formed at the upper end of the shaft 50.

The actuator device 40 is fixed above one end of the upper frame piece 21 with screws or the like. The actuator device 40 has a drive shaft which is meshed with the gear 51 of the shaft 50, and rotates the shaft 50 in response to an electric power supply. The plurality of blades 30 are operated to open or to close in response to a relative displacement of the link member 60 in the X axis direction with respect to the lateral reinforcing frame piece 26 caused by rotation of the shaft 50. That is, the link member 60 opens and closes the plurality of blades 30 by transmitting the rotational force of the shaft 50 to the plurality of blades 30. When the plurality of blades 30 are in the open state, gaps are formed between the blades 30, so that the air can enter the engine room 3 from the front opening 2 through the shutter device 10. When the plurality of blades 30 are in the close state, the gaps between the blades 30 are closed, so that the air flow from the front opening 2 to the engine room 3 is temporarily blocked.

Figure 4:
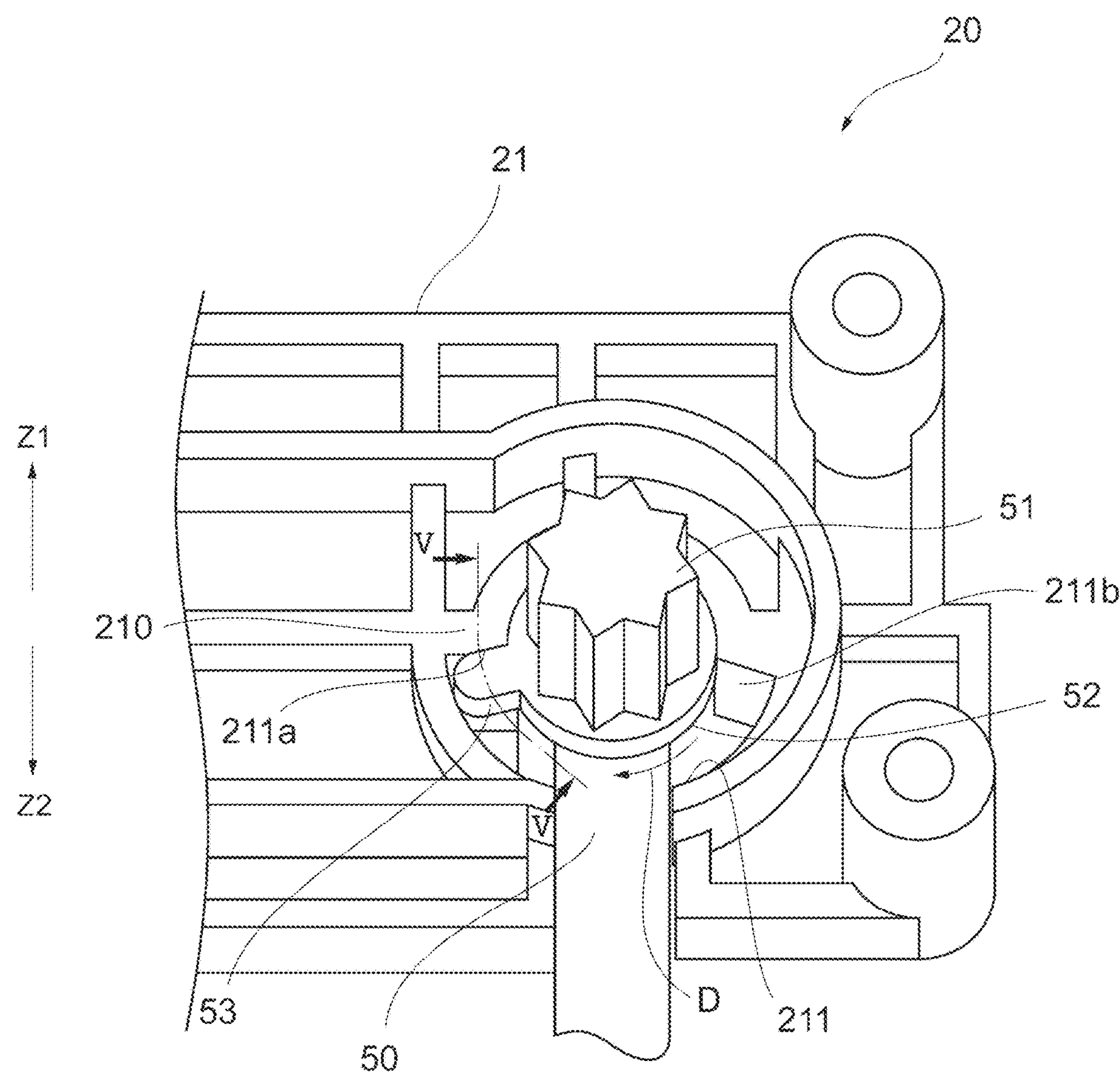
FIG. 4 is a perspective view showing a tip end structure of a shaft of the first embodiment.

As shown in FIG. 4, a disk portion 52 is formed at a base end of the gear 51 to have an outer diameter larger than an outer diameter of the gear 51. A calibration member 53 is formed on an outer periphery of the disk portion 52 to protrude outward in the radial direction to have a protruding shape. The calibration member 53 is arranged within an arcuate shaped notch shape 211 formed on a first frame member 210 if the upper frame piece 21. The first frame member 210 is a frame piece provided along an outer circumference of the disk portion 52 of the shaft 50 on the upper frame piece 21. According to the structure described above, a movable range of the calibration member 53 is defined within a range from a first inner surface 211*a* provided at one end of the notch shape 211 to a second inner surface 211*b* provided at the other end of the notch shape 211. The plurality of blades become the open state by rotating the shaft 50 to a position where the calibration member 53 comes into contact with the first inner surface 211*a*. The plurality of blades become the close state by rotating the shaft 50 to a position where the calibration member 53 comes into contact with the second inner surface 211*b*.

In the shutter device 10 in this embodiment, a calibration of rotational position of the shaft 50 is performed, for example, when an ignition switch of the vehicle C is turned on. Specifically, when the ignition switch of the vehicle C is turned on, the actuator device 40 rotates the shaft 50 in a direction indicated by the arrow D in FIG. 4, that is, the direction in which the calibration member 53 comes into contact with the first inner surface 211*a* of the frame member 210. Then, the actuator device 40 learns a position where the calibration member 53 is stopped after the calibration member 53 is displaced in the direction indicated by the arrow D as an initial position of the shaft 50. Hereinafter, the first inner surface 211*a* of the frame member 210 is also referred to as a calibration surface 211*a*. Further, the actuator device 40 subsequently rotates the shaft 50 in a reverse direction, and performs a calibration that sets a position where the calibration member 53 comes into contact with the second inner surface 211*b* of the frame member 210 as the other end position.

By the way, If a foreign matter clogs in a gap between the calibration member 53 of the shaft 50 and the calibration surface 211*a* of the frame member 210, when the calibration of the rotational position of the shaft 50 is performed, the initial position of the shaft 50 may be erroneously learned from a position where the calibration member 53 of the shaft 50 comes into contact with the foreign matter and stops. In order to avoid such erroneous calibration, the frame member 210 is provided with a discharge structure for removing the foreign matter.

A discharge hole 221 is formed on a portion of the frame member 210 located below the calibration surface 211*a* in the vertical direction so as to penetrate in the Z axis direction. The discharge hole 221 may be composed of a single hole shown in FIG. 5 or a plurality of holes.

In addition, the calibration member 53 on the shaft 50 has an opposing surface 530 which opposes the calibration surface 211*a* of the first frame member 210, and is formed in a convex shape. Specifically, the opposing surface 530 of the calibration member 53 of the shaft 50 is formed so that an upper end portion thereof in the vertical direction projects most toward the calibration surface 211*a* of the first frame member 210. A surface other than a tip end 531 on the opposing surface 530 on the calibration member 53 of the shaft 50 is formed in a tapered shape so as to be inclined with respect to the calibration surface 211*a* of the first frame member 210.

Next, an operation example of the shutter device 10 of the present embodiment is described.

Figure 5:
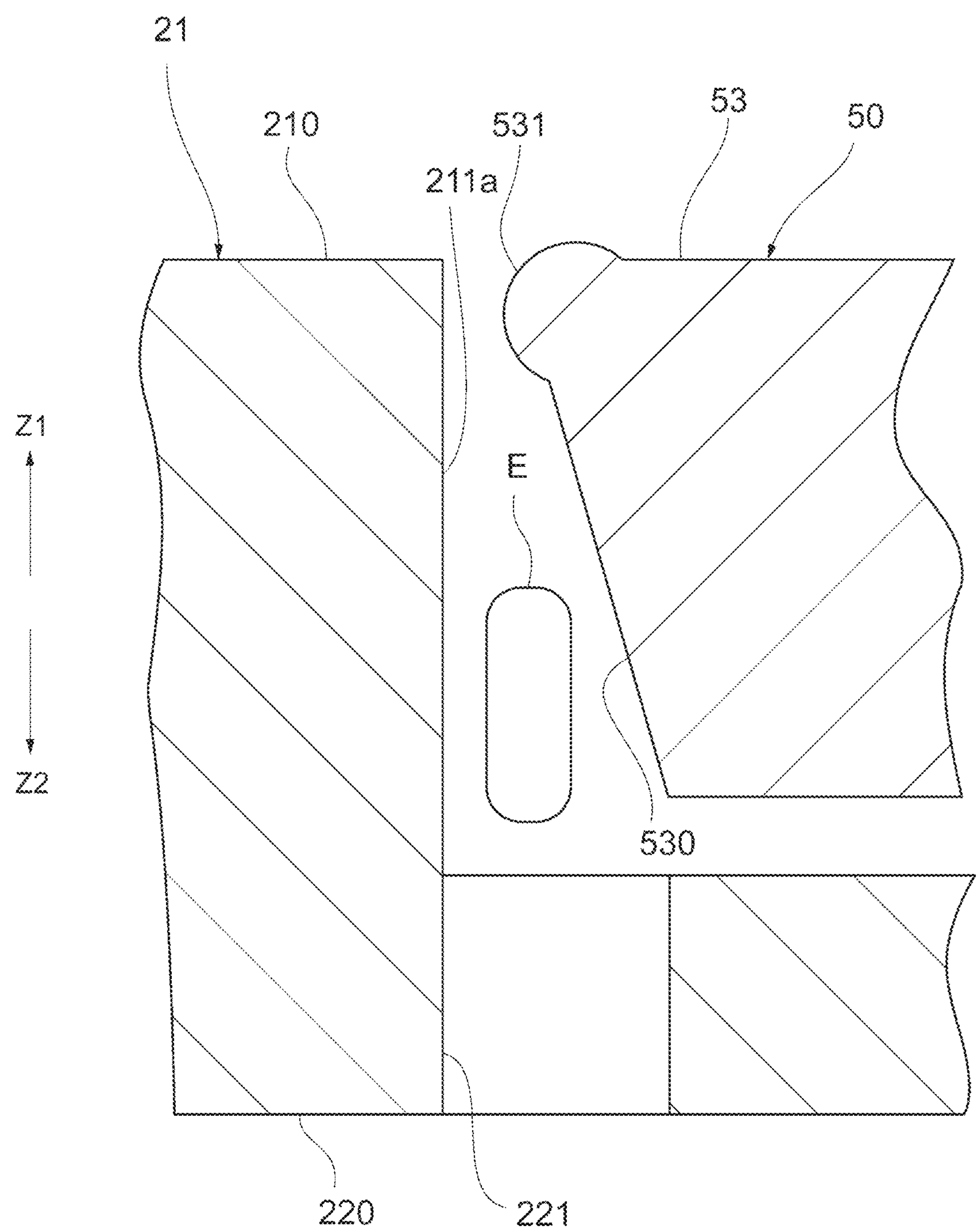
FIG. 5 is a cross-sectional view taken along a line V-V of FIG. 4.
Figure 6:
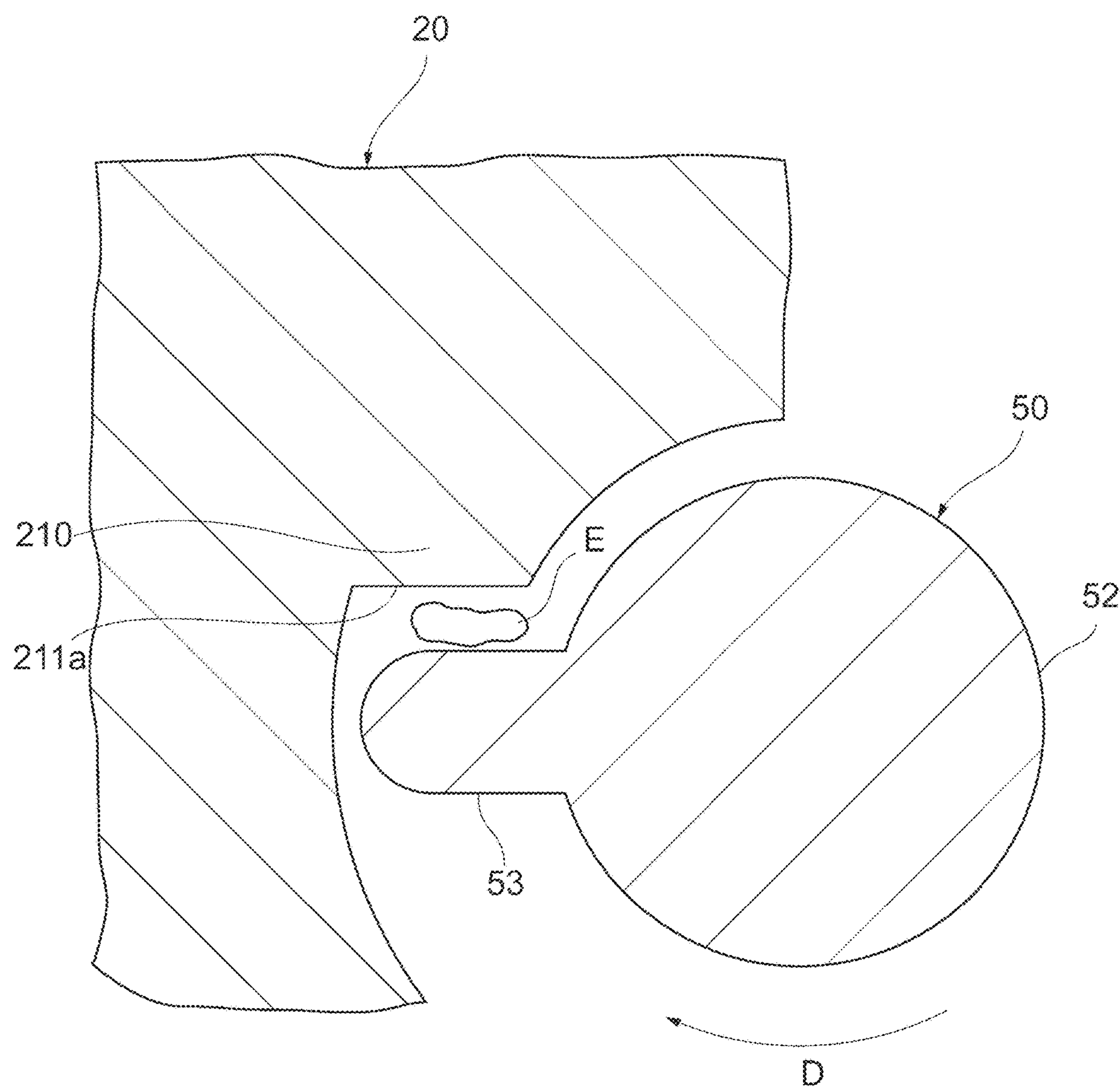
FIG. 6 is a cross-sectional view showing a calibration structure of a shaft of the first embodiment.

In the shutter device 10 of the present embodiment, as shown in FIG. 6, it is assumed that a foreign matter E such as mud is clogged between the calibration surface 211*a* of the first frame member 210 and the calibration member 53 of the shaft 50. In this case, if the calibration member 53 of the shaft 50 is displaced toward the calibration surface 211*a* of the first frame member 210 in order to perform the calibration of the rotational position of the shaft 50, at first, the tip end 531 of the opposing surface 530 of the shaft 50 comes into contact with the foreign matter E. Therefore, due to applying a force in a concentrated manner on a portion where the tip end 531 of the shaft 50 comes in contact with the foreign matter E, as shown in FIG. 5, the foreign matter E is pushed downward in the vertical direction along the opposing surface 530 formed in the tapered shape on the calibration member 53 on the shaft 50. The foreign matter E pushed out by the calibration member 53 of the shaft 50 is discharged to an outside through the discharge hole 221 formed in the second frame member 220 by its own gravitational weight and a force received from the shaft 50. Therefore, the foreign matter E existing between the calibration surface 211*a* of the first frame member 210 and the calibration member 53 of the shaft 50 can be removed. As described above, in the shutter device 10 of the present embodiment, the discharge hole 221 formed in the second frame member 220 functions as a discharge structure for discharging the foreign matter E.

According to the shutter device 10 of this embodiment described above, operations and effects described in the following (i), (ii), and (iii) can be obtained.

(i) The frame member 20 is formed with the discharge hole 221 which is provided below the calibration surface 211*a* of the first frame member 210 in the vertical direction as a discharge structure for discharging the foreign matter existing between the calibration member 53 of the shaft 50 and the calibration surface 211*a* of the first frame member 210. According to such a configuration, the foreign matter can be removed through the discharge hole 221. Therefore, since it is hard to occur a situation in which a rotational position of the shaft 50 is erroneously learned based on a position where the calibration member 53 of the shaft 50 comes into contact with the foreign matter, it is possible to more surely perform the calibration of the rotational position of the shaft 50.

(ii) The tip end 531 of the protruding portion of the opposing surface 530 of the shaft 50 comes into contact with the calibration surface 211*a* of the first frame member 210. According to such a configuration, since a force is applied to the foreign matter in a concentrated manner at a portion where the tip end 531 of the shaft 50 comes in contact with the foreign matter, the tip end 531 of the shaft 50 may penetrate the foreign matter and come into contact with the calibration surface 211*a* of the first frame member 210. Therefore, even if the foreign matter clogs a gap between the calibration member 53 of the shaft 50 and the calibration surface 211*a* of the first frame member 210, it is possible to perform the calibration of the rotational position of the shaft 50.

(iii) The surface other than the tip end 531 of the opposing surface 530 of the shaft 50 is formed in a tapered shape so as to be inclined with respect to the calibration surface 211*a* of the first frame member 210. According to such a configuration, since the foreign matter pushed out by the tip end 531 of the shaft 50 moves along the opposing surface 530, the foreign matter can be easily removed.

Modifications

Next, a modification of the shutter device 10 of the first embodiment is described.

Figure 7:
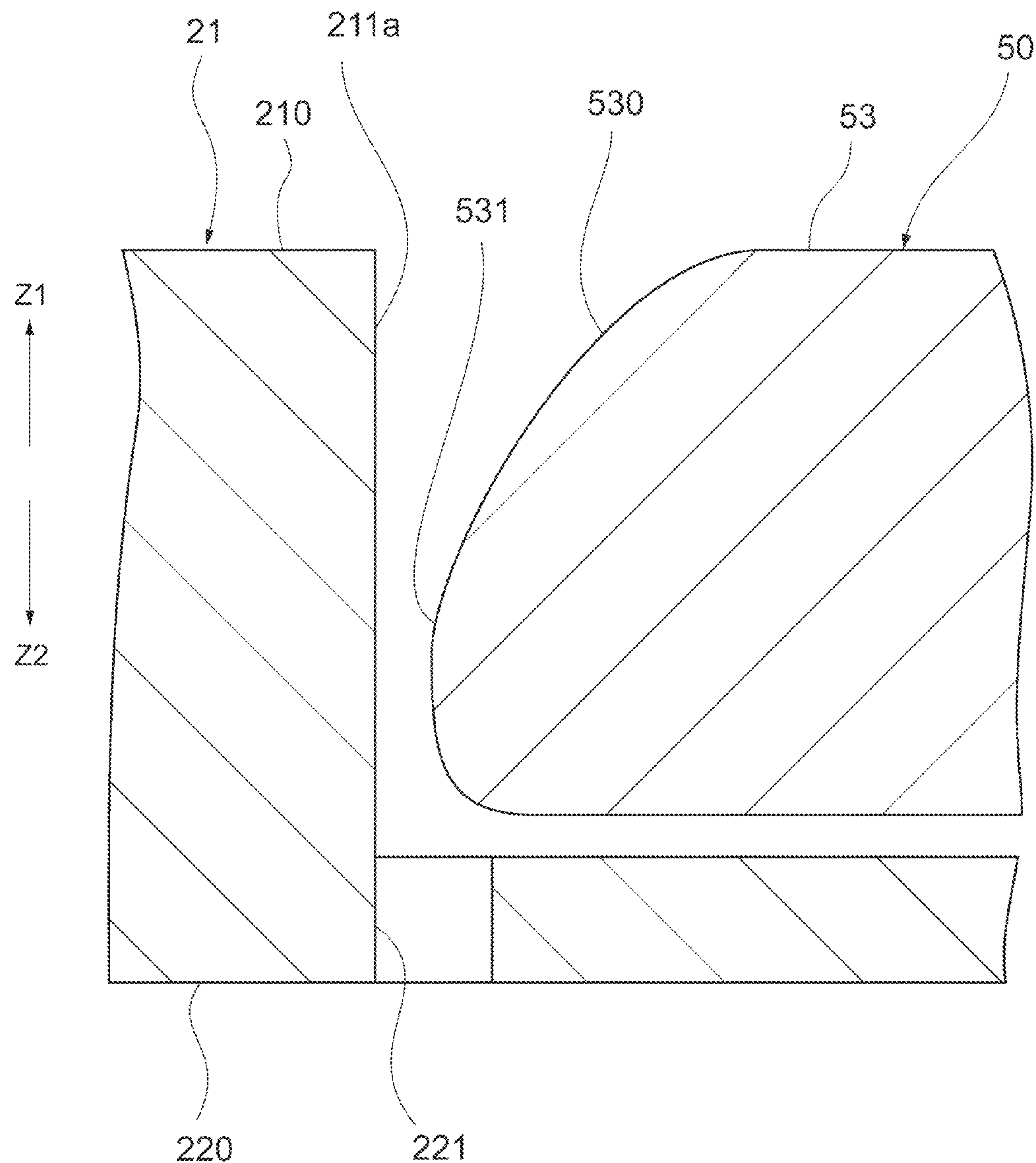
FIG. 7 is a cross-sectional view showing a calibration structure of a shaft of a modified example of the first embodiment.

For example, as shown in FIG. 7, the opposing surface 530 of the calibration member 53 of the shaft 50 may be formed in a convex shape so that a lower end portion in the vertical direction protrudes toward the calibration surface 211*a* of the first frame portion 210.

Figure 8:
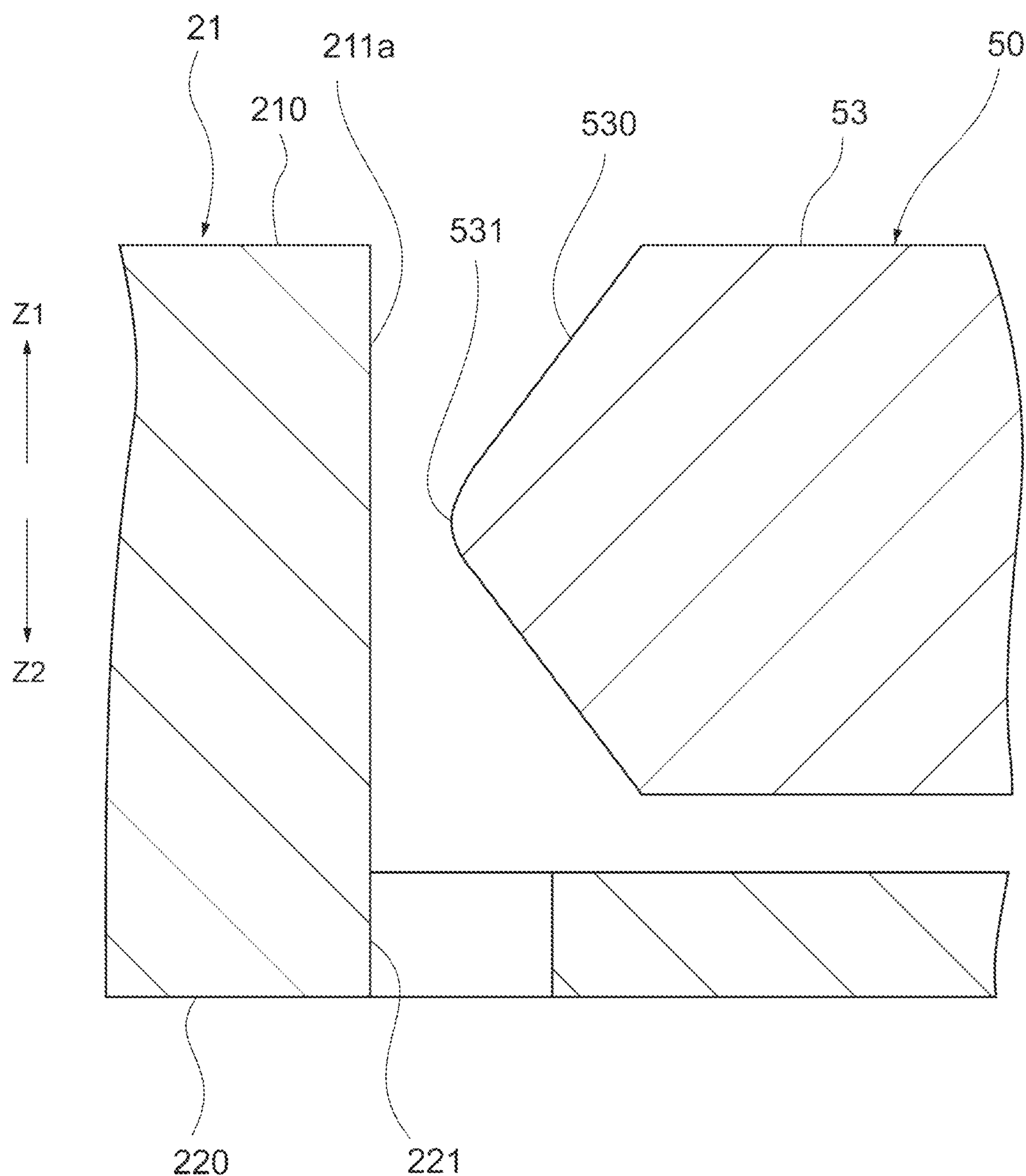
FIG. 8 is a cross-sectional view showing a calibration structure of a shaft of a modified example of the first embodiment.

Alternatively, as shown in FIG. 8, the opposing surface 530 of the calibration member 53 of the shaft 50 may be formed in a convex shape so that the central portion thereof in the vertical direction protrudes toward the calibration surface 211*a* of the first frame portion 210.

Figure 9:
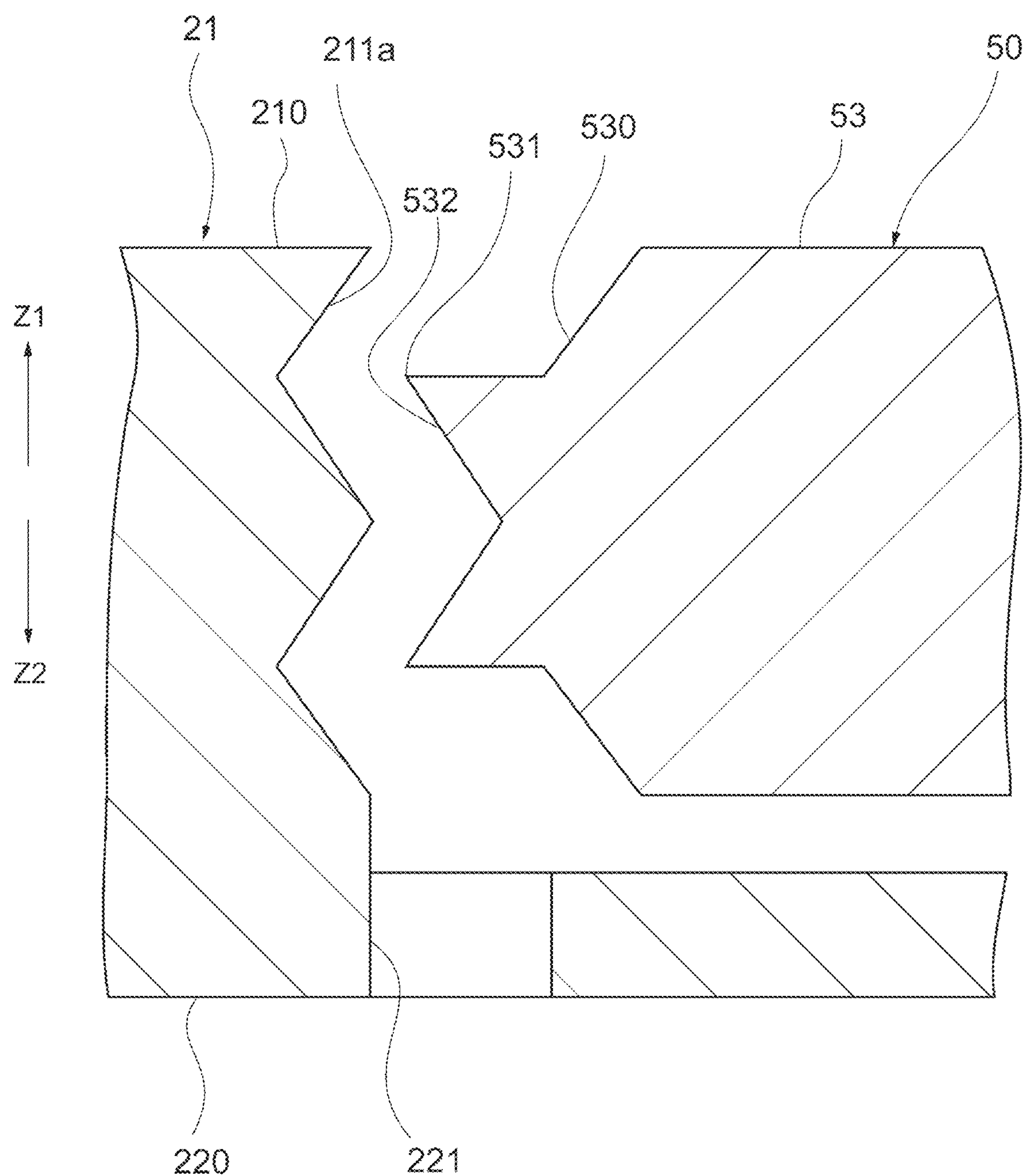
FIG. 9 is a cross-sectional view showing a calibration structure of a shaft of a modified example of the first embodiment.

Alternatively, as shown in FIG. 9, the opposing surface 530 of the calibration member 53 of the shaft 50 may have a shape formed with a central portion in the vertical direction protruding toward the calibration surface 211*a* of the first frame member 210 and a groove 532 in a depressed shape placed on the protruding tip end 531.

Figure 10:
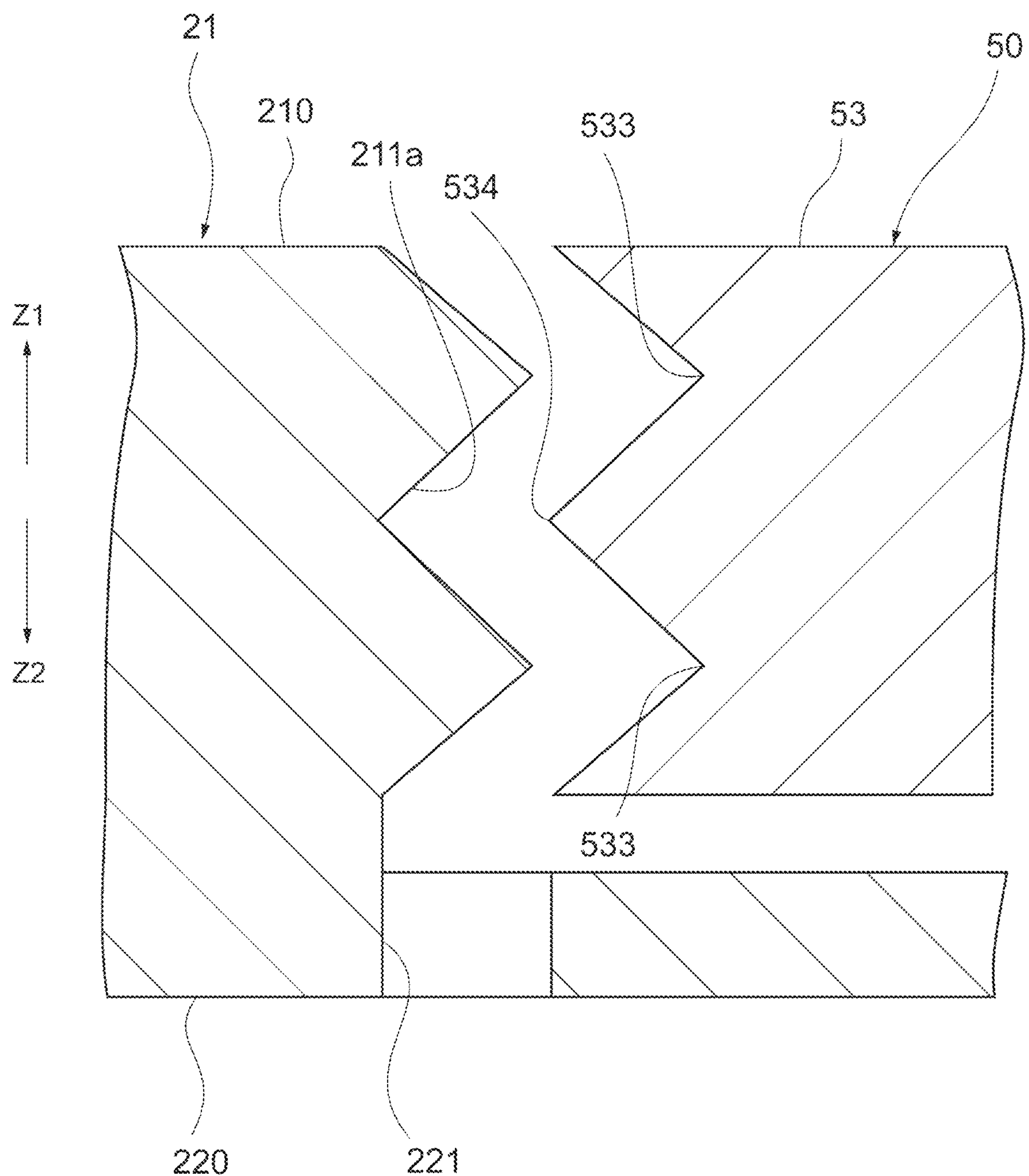
FIG. 10 is a cross-sectional view showing a calibration structure of a shaft of a modified example of the first embodiment.

Alternatively, as shown in FIG. 10, the opposing surface 530 of the calibration member 53 of the shaft 50 may have a shape in which valley portions 533 and peak portions 534 are alternately provided.

When the shape shown in FIG. 9 and FIG. 10 is adopted as the shape of the opposing surface 530 of the shaft 50, the shape of the calibration surface 211*a* of the first frame member 210 may be changed according to the shape.

Even when the shape shown in FIG. 7 to FIG. 10 is adopted as the shape of the opposing surface 530 of the calibration member 53 of the shaft 50, the operation and the effect are the same as or similar to that of the shutter device 10 of the first embodiment described above.

The opposing surface 530 of the shaft 50 may adopt a shape shown in FIG. 9 or FIG. 10. In those examples, the opposing surface 530 of the shaft 50 may have a plurality of protruding shapes protruding toward the calibration surface 211*a* of the first frame member 210. According to such a configuration, when the opposing surface 530 of the shaft 50 comes into contact with the foreign matter, the tip end 531 of each of the convexly formed portions may penetrate the foreign matter and come into contact with the calibration surface 211*a* of the first frame member 210, therefore, it is possible to perform the calibration of the rotational position of the shaft 50 more reliably.

Second Embodiment

Next, the shutter device 10 of a second embodiment is described. Hereinafter, differences from the shutter device 10 of the first embodiment are mainly described.

Figure 11:
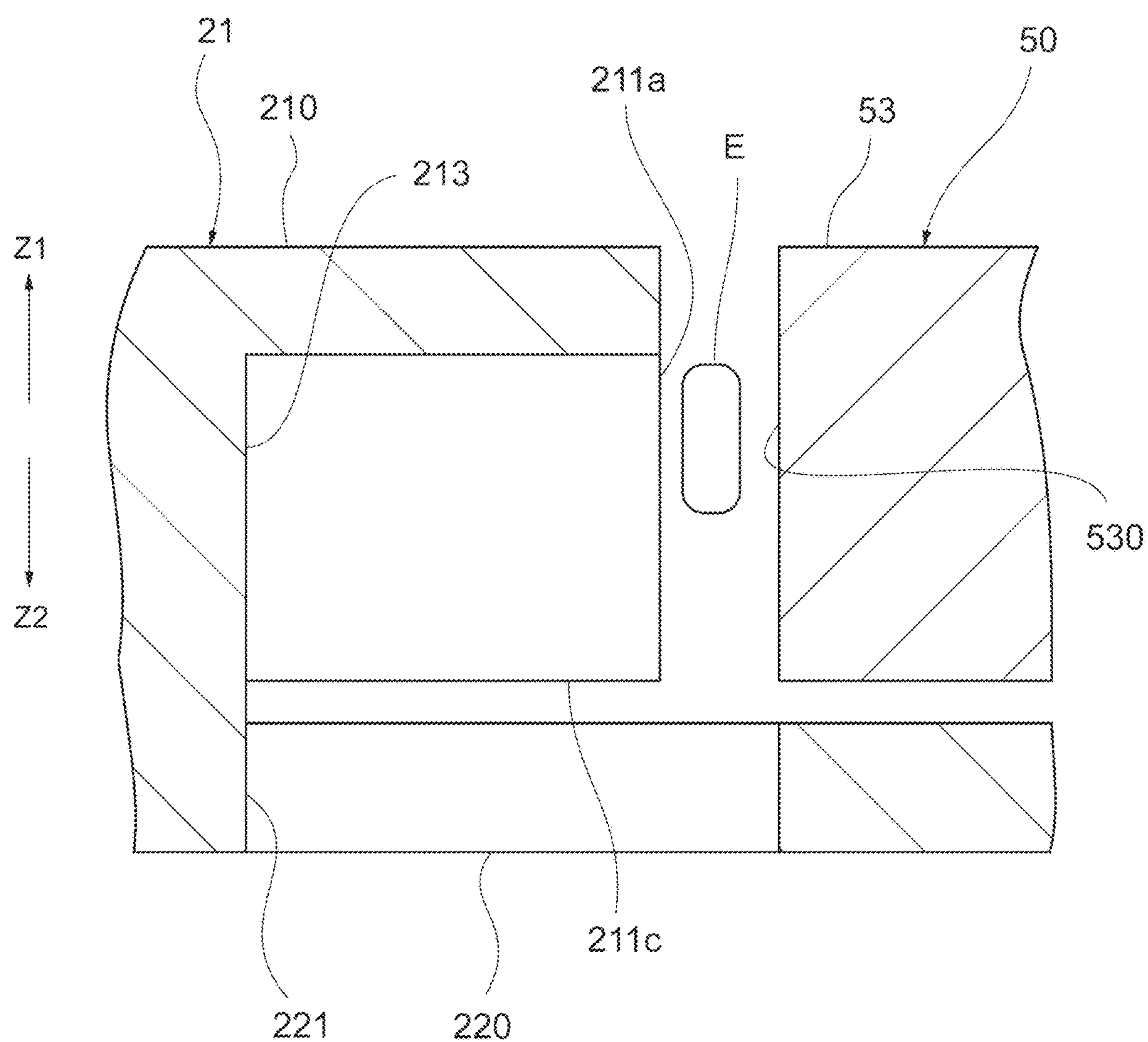
FIG. 11 is a cross-sectional view showing a calibration structure of a shaft of a second embodiment.

In the shutter device 10 of the present embodiment, as shown in FIG. 11, the opposing surface 530 of the shaft 50 is formed as a plane parallel to the calibration surface 211*a* of the first frame member 210.

On the other hand, a notch shape 213 is formed on the calibration surface 211*a* of the first frame member 210 so as to cut out a part thereof. The notch shape 213 is formed so as to open to the calibration surface 211*a* of the first frame member 210 and a bottom surface 211*c* of the first frame member 210. The notch shape 213 is not limited to a single number, and is one of a plurality of notch shapes 213.

Further, the discharge hole 221 of the second frame member 220 is formed over a portion located below the calibration surface 211*a* of the first frame member 210 in the vertical direction and a portion located below the notch shape 213 of the first frame member 210 in the vertical direction.

Next, an operation example of the shutter device 10 of the present embodiment is described.

In the shutter device 10 of the present embodiment, it is assumed that foreign matter E such as mud enters and is clogged in a gap between the calibration surface 211*a* of the first frame member 210 and the calibration member 53 of the shaft 50. In this case, when the calibration member 53 of the shaft 50 is rotated and displaced toward the calibration surface 211*a* of the first frame member 210 in order to calibrate the rotational position of the shaft 50, the foreign matter E is extruded into the notch shape 213 of the frame member 210 by the calibration member 53 of the shaft 50. The foreign matter E extruded into the notch shape 213 is discharged to the outside through the discharge hole 221 of the second frame member 220. Therefore, it is possible to remove the foreign matter E existing between the calibration surface 211*a* of the first frame member 210 and the calibration member 53 of the shaft 50. As described above, in the shutter device 10 of the present embodiment, not only the discharge hole 221 formed in the second frame member 220 but also the notch shape 213 formed in the first frame member 210 discharges the foreign matter E and both function as the discharge structure.

According to the shutter device 10 of this embodiment described above, the technical solutions described in the following (iv) can be obtained.

(iv) The frame member 20 is formed with the discharge hole 221 provided below the calibration surface 211*a* of the first frame member 210 in the vertical direction and the notch shape 213 provided so as to cut out a part of the calibration surface 211*a* of the first frame member 210 as the discharge structure for discharging foreign matters existing between the calibration member 53 of the shaft 50 and the calibration surface 211*a* of the first frame member 210. According to such a configuration, it is possible to remove the foreign matter through the notch shape 213 and the discharge hole 221. Therefore, since it is hard to occur a situation in which a rotational position of the shaft 50 is erroneously learned based on a position where the calibration member 53 of the shaft 50 comes into contact with the foreign matter, it is possible to more surely perform the calibration of the rotational position of the shaft 50.

Modifications

Next, a modification of the shutter device 10 of the second embodiment is described.

Figure 12:
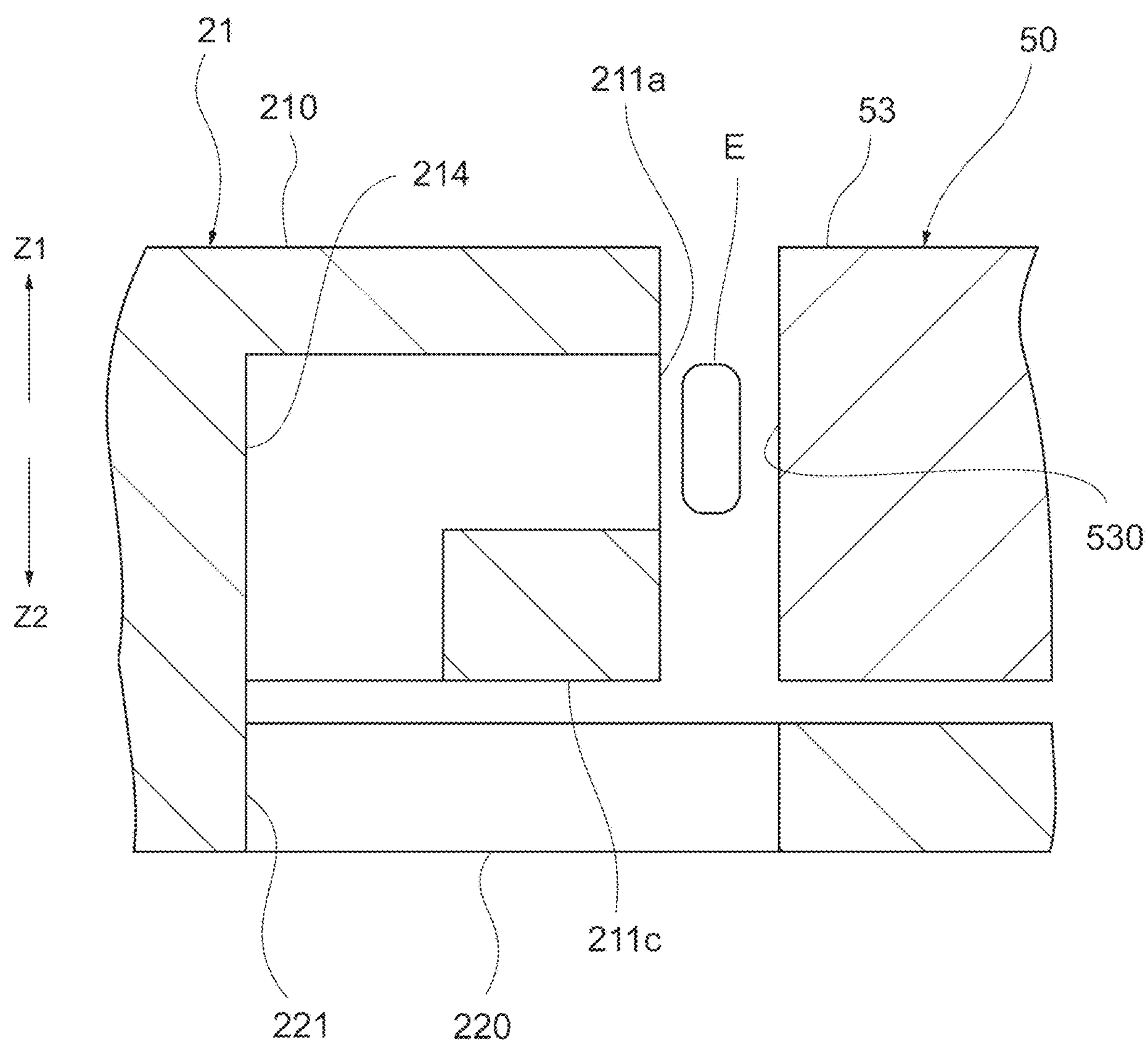
FIG. 12 is a cross-sectional view showing a calibration structure of a shaft of a modified example of the second embodiment.

As shown in FIG. 12, a through hole 214 is formed in the first frame member 210 of this modification so as to penetrate an inside of the first frame member 210 from the calibration surface 211*a* toward the bottom surface 211*c*. In this modification, the bottom surface 211*c* of the first frame member 210 corresponds to an outer surface different from the calibration surface 211*a*.

Even with such a configuration, the foreign matter existing between the calibration structure 53 of the shaft 50 and the calibration surface 211*a* of the first frame member 210 can be removed and discharged to the outside through the through holes 214 of the first frame member 210 and the discharge hole 221 of the second frame member 220, therefore, it is possible to surely perform the calibration of the rotational position of the shaft 50.

Other Embodiments

The preceding embodiments may be practiced in the following modes.

Figure 13:
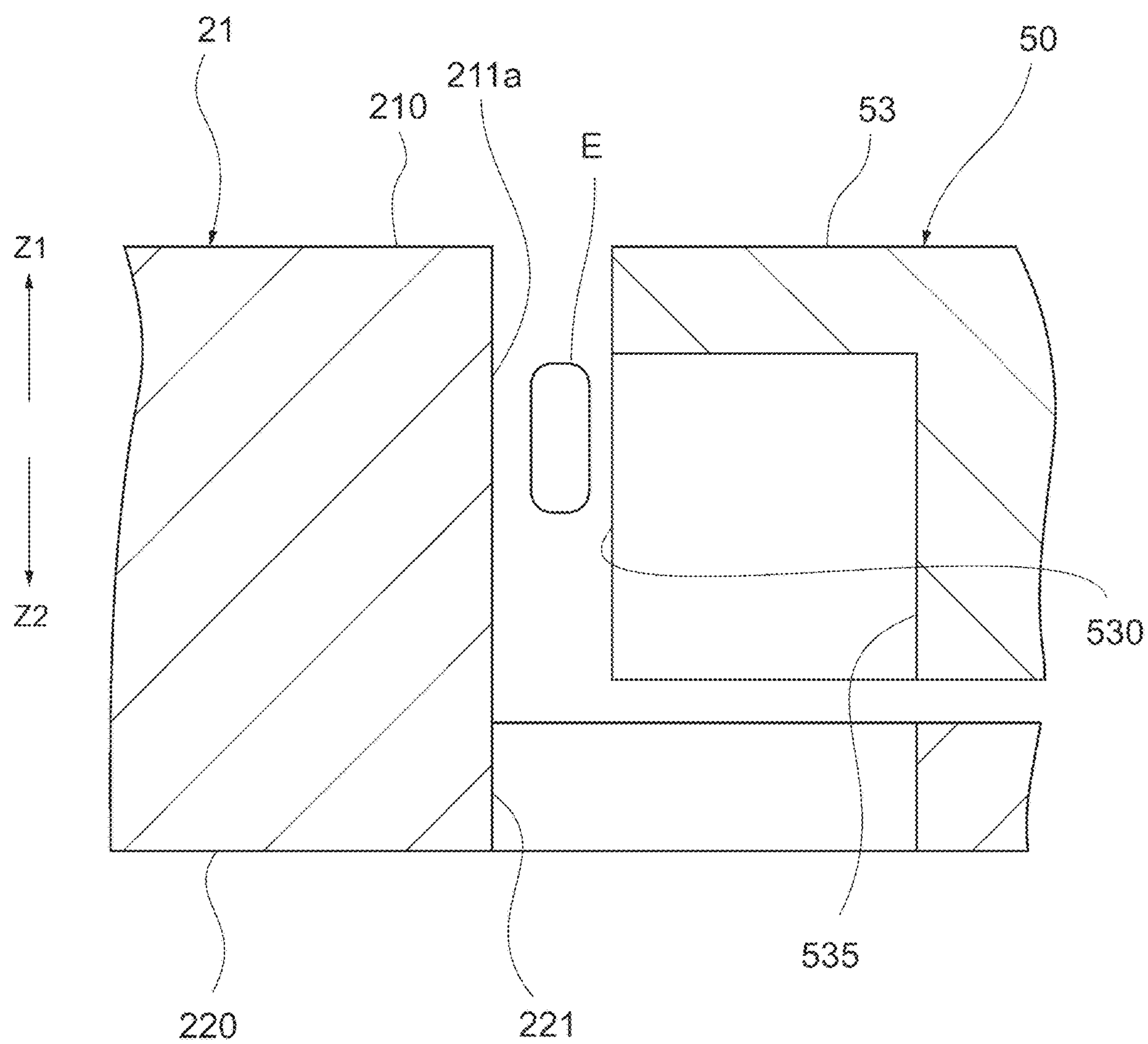
FIG. 13 is a cross-sectional view showing a calibration structure of a shaft of the other embodiment.

The notch shape 213 is formed on the first frame member 210 in the shutter device 10 of the second embodiment, alternatively, a notch shape 535 is formed on the calibration structure 53 of the shaft 50 as shown in FIG. 13. That is, a foreign matter discharging structure may be formed in the calibration structure 53 of the shaft 50. The calibration structure 53 of the shaft 50 may be provided with the through hole as formed in the first frame member 210 of FIG. 12 instead of the notch shape 535. Further, the discharging structure may be formed in both the first frame member 210 and the shaft 50 by combining the structure of the first frame portion 210 shown in FIG. 11 or FIG. 12 and the structure of the shaft 50 shown in FIG. 13.

The present disclosure is not limited to the specific examples described above. The specific examples described above which have been appropriately modified in design by those skilled in the art are also encompassed in the scope of the present disclosure so far as the modified specific examples have the features of the present disclosure. Each element included in each of the specific examples described above, and the placement, condition, shape, and the like of the element are not limited to those illustrated, and can be modified as appropriate. The combinations of the elements in each of the specific examples described above can be changed as appropriate, as long as it is not technically contradictory.

What is claimed is:

1. A shutter device for a vehicle, comprising:

a blade;

a frame member which supports the blade in a rotatable manner;

a shaft arranged in a vertical direction along the frame member;

an actuator device which is fixed above an upper frame piece and is meshed with an upper end of the shaft to rotate the shaft;

a link member which opens and closes the blade by transmitting a rotational force of the shaft to the blade;

a contact structure having a member formed on the shaft and a surface formed on the frame member which are formed to contact each other at a rotational end of the shaft; and a discharge structure formed in the frame member, the discharge structure discharging a foreign matter existing between the member of the shaft and the surface of the frame member, wherein the member is a calibration member, the surface is a calibration surface, the contact structure provides a calibration structure which calibrates a rotational position of the shaft by performing a calibration based on an initial position where the calibration member is operated by the actuator to come into physical contact with the calibration surface, the discharge structure includes a discharge hole provided below the calibration surface of the frame member in the vertical direction, and the discharge structure includes a notch shape provided so as to cut out a part of the calibration surface of the frame member, or a through hole provided so as to penetrate from the calibration surface to another outer surface of the frame member in the vertical direction.

2. The shutter device claimed in claim 1, wherein the discharge structure is one of a plurality of discharge structures formed on the frame member.

3. The shutter device claimed in claim 1, wherein the calibration member on the shaft has an opposing surface which opposes the calibration surface of the frame member, and is formed in a convex shape partially protruding toward the calibration surface of the frame member, and wherein the convex shape on the opposing surface of the shaft has a tip end coming into contact with the calibration surface of the frame member.

4. The shutter device claimed in claim 3, wherein the opposing surface of the shaft has the tip end and a remaining surface, the remaining surface being formed in a tapered shape so as to be inclined with respect to the calibration surface of the frame member.

5. The shutter device claimed in claim 3, wherein the opposing surface of the shaft has a plurality of protruding shapes protruding toward the calibration surface of the frame member.

6. A shutter device for a vehicle, comprising:

a blade;

a frame member which supports the blade in a rotatable manner;

a shaft arranged in a vertical direction along the frame member;

an actuator device which is fixed above an upper frame piece and is meshed with an upper end of the shaft to rotate the shaft;

a link member which opens and closes the blade by transmitting a rotational force of the shaft to the blade;

a contact structure having a member formed on the shaft and a surface formed on the frame member which are formed to contact each other at a rotational end of the shaft; and a discharge structure formed in the member on the shaft, the discharge structure discharging a foreign matter existing between the member of the shaft and the surface of the frame member, wherein the member is a calibration member, the surface is a calibration surface, the contact structure provides a calibration structure which calibrates a rotational position of the shaft by performing a calibration based on an initial position where the calibration member is operated by the actuator to come into physical contact with the calibration surface, the discharge structure includes a discharge hole provided below the calibration surface of the frame member in the vertical direction, and the discharge structure includes a notch shape provided so as to cut out a art of the calibration surface of the frame member, or a through hole provided so as to penetrate from the calibration surface to another outer surface of the frame member in the vertical direction.

7. The shutter device claimed in claim 6, wherein the calibration member on the shaft has an opposing surface which opposes the calibration surface of the frame member, and is formed in a convex shape partially protruding toward the calibration surface of the frame member, and wherein the convex shape on the opposing surface of the shaft has a tip end coming into contact with the calibration surface of the frame member.

8. The shutter device claimed in claim 7, wherein the opposing surface of the shaft has the tip end and a remaining surface, the remaining surface being formed in a tapered shape so as to be inclined with respect to the calibration surface of the frame member.

9. The shutter device claimed in claim 7, wherein the opposing surface of the shaft has a plurality of protruding shapes protruding toward the calibration surface of the frame member.

* * * * *